(12) United States Patent
Ramlaoui (10) Patent No.: US 11,754,019 B2
(45) Date of Patent: Sep. 12, 2023

(54) ARTICULATING SLIDER FOR NACELLE (71) Applicant: ROHR, INC., Chula Vista, CA (US)

(72) Inventor: Jihad Ramlaoui, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/554,067

(22) Filed: Dec. 17, 2021

(65) Prior Publication Data
US 2023/0193854 A1 Jun. 22, 2023

(51) Int. Cl.
*F02K 1/72* (2006.01)
*B64D 29/06* (2006.01)

(52) U.S. Cl.
CPC ............ *F02K 1/72* (2013.01); *F05D 2250/12* (2013.01); *F05D 2250/34* (2013.01); *F05D 2260/50* (2013.01)

(58) Field of Classification Search
CPC ... F02K 1/72; F02K 1/70; F02K 1/625; B64D 29/06; B64D 29/08; F16C 29/02; F16C 29/005
See application file for complete search history.

(56) References Cited

U.S. PATENT DOCUMENTS

| 4,541,673 | A |   | 9/1985 | Greiert |
| 5,778,659 | A | * | 7/1998 | Duesler ................. F02K 1/09 244/11 OB |
| 8,443,586 | B2 |   | 5/2013 | Schwark, Jr. et al. |
| 8,511,973 | B2 |   | 8/2013 | Ramlaoui et al. |
| 8,875,486 | B2 |   | 11/2014 | Roberts |
| 2006/0248977 | A1 | * | 11/2006 | Umetsu ............... G03F 7/70816 74/490.07 |
| 2011/0042525 | A1 |   | 2/2011 | Parker |
| 2013/0048807 | A1 | * | 2/2013 | Roberts ................. F16C 29/005 384/26 |
| 2016/0201600 | A1 | * | 7/2016 | Charron ................. B64D 29/00 239/265.19 |
| 2016/0208738 | A1 |   | 7/2016 | Peyron et al. |

FOREIGN PATENT DOCUMENTS

WO 2015069350 5/2015

OTHER PUBLICATIONS

European Patent Office, European Partial Search Report dated May 9, 2023 in Application No. 22214566.6.

* cited by examiner

*Primary Examiner* — Andrew H Nguyen
(74) *Attorney, Agent, or Firm* — SNELL & WILMER L.L.P.

(57) ABSTRACT

A thrust reverser may comprise translating sleeve panel. A first articulating slider and a second articulating slider may be located at a circumferential end of the translating sleeve panel. Each of the first articulating slider and the second articulating slider may include a slider bar and a slider ball. The slider ball may be attached to the translating sleeve panel and located in a spherical opening defined by the slider bar.

14 Claims, 9 Drawing Sheets

ARTICULATING SLIDER FOR NACELLE

FIELD

The present disclosure relates to propulsion systems and, more specifically, to articulating slider assemblies for nacelle thrust reversers.

BACKGROUND

A nacelle for a gas turbine engine generally includes an inlet, a fan cowl, a thrust reverser, and an exhaust section. The nacelle is typically mounted to a wing or to a fuselage of an aircraft via a pylon. The thrust reverser may include a translating sleeve or translating door(s) configured to translate to a position, wherein a bypass airflow is redirected from a rearward (or aft) direction to an, at least partially, forward direction, thereby producing a reverse thrust to decelerate forward motion of the aircraft. The translating sleeve and/or translating doors may have a slider attached thereto. The slider may be located in and translate along a track. Various sliders may be subjected to high moments, which can result in peaking of contact stresses at the forward and aft edges of the slider. Contact stresses (e.g., contact between the edges of the slider and track) can cause wear and/or damage to the slider and/or to the track.

SUMMARY

A thrust reverser is disclosed herein. In accordance with various embodiments, the thrust reverser may comprise a first translating sleeve panel, a first articulating slider located at a circumferential end of the first translating sleeve panel and a second articulating slider located at the circumferential end of the first translating sleeve panel. The first articulating slider includes a first slider bar and a first slider ball. The first slider ball is attached to the first translating sleeve panel and is located in a first spherical opening defined by the first slider bar. The second articulating slider includes a second slider bar and a second slider ball. The second slider ball is attached to the first translating sleeve panel and is located in a second spherical opening defined by the second slider bar.

In various embodiments, the first articulating slider further includes a first neck extending between the first slider ball and the circumferential end of the first translating sleeve panel, and the second articulating slider further includes a second neck extending between the second slider ball and the circumferential end of the first translating sleeve panel. In various embodiments, the first neck is located through a first bar slot defined by the first slider bar and the second neck is located through a second bar slot defined by the second slider bar.

In various embodiments, a hinge beam may be located proximate the circumferential end of the first translating sleeve panel. The first translating sleeve panel translates relative to the hinge beam. In various embodiments, a secondary track may be coupled to the hinge beam, and the first slider bar and the second slider bar may be located in a secondary track channel defined by the secondary track. In various embodiments, the first slider bar and the second slider bar may be located in a secondary track channel defined by the hinge In various embodiments, a second translating sleeve panel is located radially inward of the first translating sleeve panel and is configured to translate relative to the hinge beam. A primary slider is coupled to the second translating sleeve panel.

In various embodiments, a primary slider track may be coupled to the hinge beam. The primary slider may be located in a primary track channel defined by the primary slider track. In various embodiments, the primary slider may be located in a primary track channel defined by the hinge beam.

A nacelle is also disclosed herein. In accordance with various embodiments, the nacelle comprises an inlet, a fan cowl; and a thrust reverser. The thrust reverser may include a first translating sleeve panel, a first articulating slider located at a circumferential end of the first translating sleeve panel, and a second articulating slider located at the circumferential end of the first translating sleeve panel. The first articulating slider includes a first slider bar and a first slider ball. The first slider ball is attached to the first translating sleeve panel and is located in a first spherical opening defined by the first slider bar. The second articulating slider includes a second slider bar and a second slider ball. The second slider ball is attached to the first translating sleeve panel and located in a second spherical opening defined by the second slider bar.

In various embodiments, the first articulating slider further includes a first neck extending between the first slider ball and the circumferential end of the first translating sleeve panel. The first neck being is located through a first bar slot defined by the first slider bar. The second articulating slider further includes a second neck extending between the second slider ball and the circumferential end of the first translating sleeve panel. The second neck being located through a second bar slot defined by the second slider bar.

In various embodiments, a hinge beam may be located proximate the circumferential end of the first translating sleeve panel. The first translating sleeve panel translates relative to the hinge beam. The first slider bar and the second slider bar are located in a secondary track channel defined by at least one of the hinge beam or a secondary track coupled to the hinge beam.

In various embodiments, the thrust reverser further comprises a second translating sleeve panel located radially inward of the first translating sleeve panel and configured to translate relative to the hinge beam. A primary slider is coupled to the second translating sleeve panel. An axial length of the primary slider is less than an axial length measured between a forward end of the first slider bar and an aft end of the second slider bar.

In various embodiments, the primary slider is located in a primary track channel defined by at least one of the hinge beam or a primary slider track coupled to the hinge beam.

An actuation arrangement for a thrust reverser is also disclosed herein. In accordance with various embodiments, the actuation arrangement comprises a carrier configured to translate relative to a frame of the thrust reverser and move a reverser door between a stowed position and a deployed position, a first articulating slider attached to a first end of the carrier, and a second articulating slider attached to the first end of the carrier. The first articulating slider includes a first slider bar and a first slider ball. The first slider ball is attached to the carrier and is located in a first spherical opening defined by the first slider bar. The second articulating slider includes a second slider bar and a second slider ball. The second slider ball is attached to the carrier and is located in a second spherical opening defined by the second slider bar.

In various embodiments, an upper slider is coupled to a second end of the carrier. In various embodiments, the upper slider may comprise a third articulating slider including a third slider bar and a third slider ball. The third slider ball is attached to the carrier and is located in a third spherical opening defined by the third slider bar. In various embodiments, the third slide bar may have a rectangular shape.

In various embodiments, a track is coupled the thrust reverser. The track defines a first channel and a second channel. The third slider bar is located in the first channel and the first slider bar and the second slider bar are located in the second channel. In various embodiments, a radial length of the first channel and a radial length of the third slider bar are configured to create a gap between an upper surface of the track and an upper bar surface of the third slider bar.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures but may not necessarily be repeated herein for the sake of clarity.

As used herein, the term "aft" refers to the direction associated with the tail (i.e., the back end) of an aircraft, or generally, to the direction of exhaust of the gas turbine engine. As used herein, the term "forward" refers to the direction associated with the nose (i.e., the front end) of an aircraft, or generally, to the direction of flight or motion.

A first component that is "radially outward" of a second component means that the first component is positioned at a greater distance away from a central longitudinal axis of the nacelle than the second component. A first component that is "radially inward" of a second component means that the first component is positioned closer to the central longitudinal axis of the nacelle than the second component.

Figure 1A:
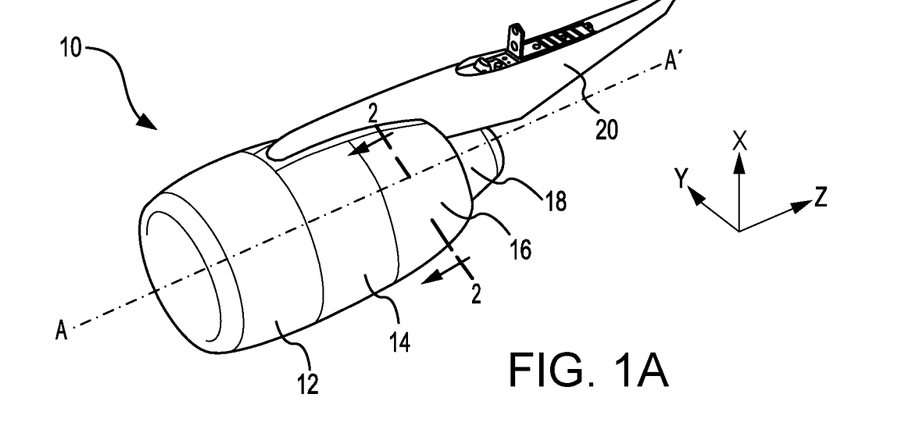
FIG. 1A illustrates a perspective view of a nacelle, in accordance with various embodiments.

Referring to FIG. 1A, a nacelle 10 for a gas turbine engine is illustrated. In accordance with various embodiments, nacelle 10 may comprise an inlet 12, a fan cowl 14, a thrust reverser 16, and an exhaust system 18. In various embodiments, nacelle 10 may include a pylon 20. Pylon 20 may be configured to mount nacelle 10 and an engine surrounded by nacelle 10 to an aircraft structure, such as a wing or an aircraft fuselage.

Figure 1B:
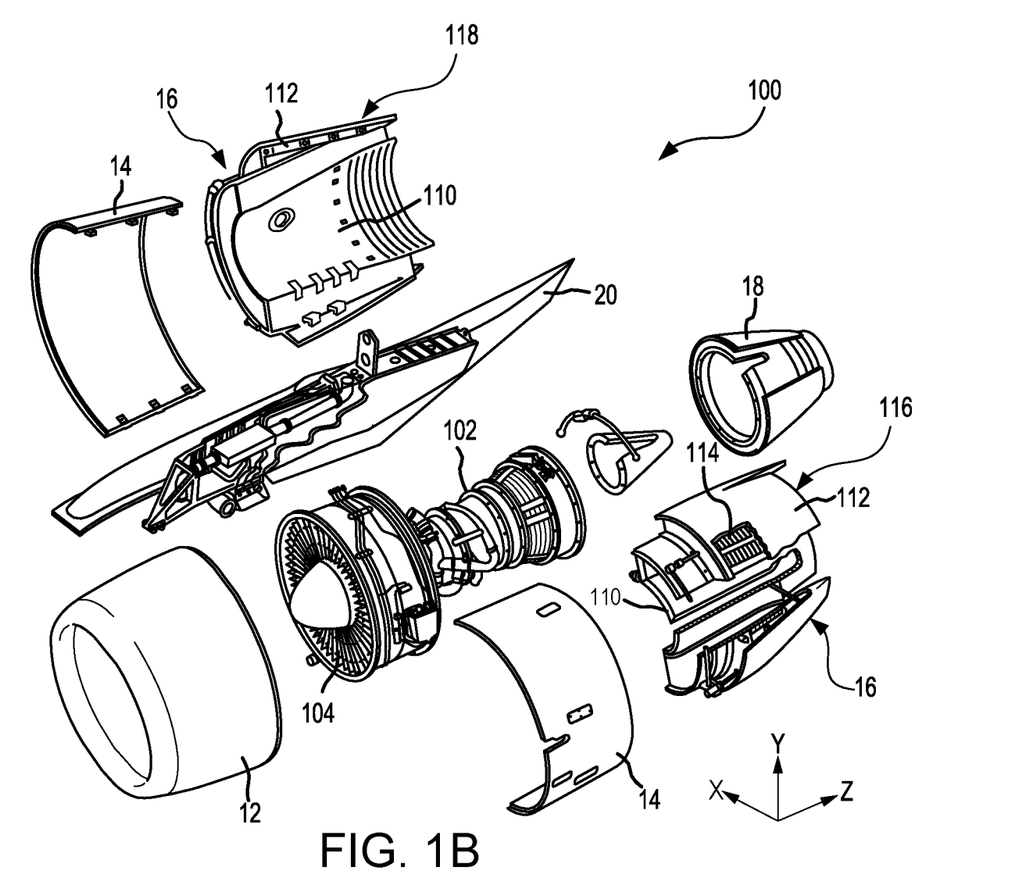
FIG. 1B illustrates an exploded view of a propulsion system, in accordance with various embodiments.

With reference to FIG. 1B, and continuing reference to FIG. 1A, an exploded view of a propulsion system 100 is illustrated. In accordance with various embodiments, propulsion system 100 includes nacelle 10 and a gas turbine engine 102. Gas turbine engine 102 may be surrounded by components of nacelle 10. Nacelle 10 may provide smooth aerodynamic surfaces for airflow around and into gas turbine engine 102. Nacelle 10 may define at least a portion of one or more bypass air duct(s) through propulsion system 100.

In operation, a fan 104 of gas turbine engine 102 draws and directs a flow of air into and through propulsion system 100. The air may be divided into two principal flow paths: a core flow path through the core of gas turbine engine 102, and a bypass flow path through one or more bypass ducts outside of the core of gas turbine engine 102. The air in the core flow path may be directed through a compressor of gas turbine engine 102 that increases the air flow pressure, and then through a combustor of gas turbine engine 102 where the air is mixed with fuel and ignited. The combustion of the fuel and air mixture causes a series of turbine blades aft of the combustor to rotate and drive the rotors of the compressor and the fan 104 of gas turbine engine 102. The exhaust gases are then directed through exhaust system 18.

The air in the bypass flow path may be directed around the engine core through one or more duct(s) defined by nacelle 10. In various embodiments, at least a portion of the bypass flow path is defined by thrust reverser 16. For example, thrust reverser 16 may comprise a translating sleeve 112 and an inner fixed structure (IFS) 110. Bypass air output from fan 104 may flow between an exterior (or radially outward) surface of IFS 110 and an interior (or radially inward) surface of translating sleeve 112. In accordance with various embodiments, thrust reverser 16 may include a cascade of vanes 114 (referred to herein as cascade 114). Translating sleeve 112 is configured to translate aft and expose cascade 114, thereby generating reverse thrust. In accordance with various embodiments, thrust reverser 16 may be split into a left (or first) half 116 and a right (or second) half 118.

A central axis A (FIG. 1A) is illustrated extending through the nacelle 10. The central axis A may define a fore direction (negative Z-direction) and an aft direction (positive Z-direction). Various embodiments of the disclosure may be described in relation to the central axis A. For example, the left half 116 may be considered positioned to the port or left side of the central axis A (looking in the fore direction (negative Z-direction)) while the right half 118 may be considered positioned to the right or starboard side of the central axis A (looking in the fore direction). More generally, reference to a half of the thrust reverser may broadly refer to a first translating sleeve and first IFS positioned opposite a second translating sleeve and second IFS with respect to the central axis A, there being no preferred up or down or side to side orientation. As used herein, a first component positioned opposite a second component does not imply the second component is a mirror image of the first component or the second component is positioned symmetrically opposite to the first component, though the disclosure contemplates such mirror image and symmetric configurations and positioning.

Figure 2:
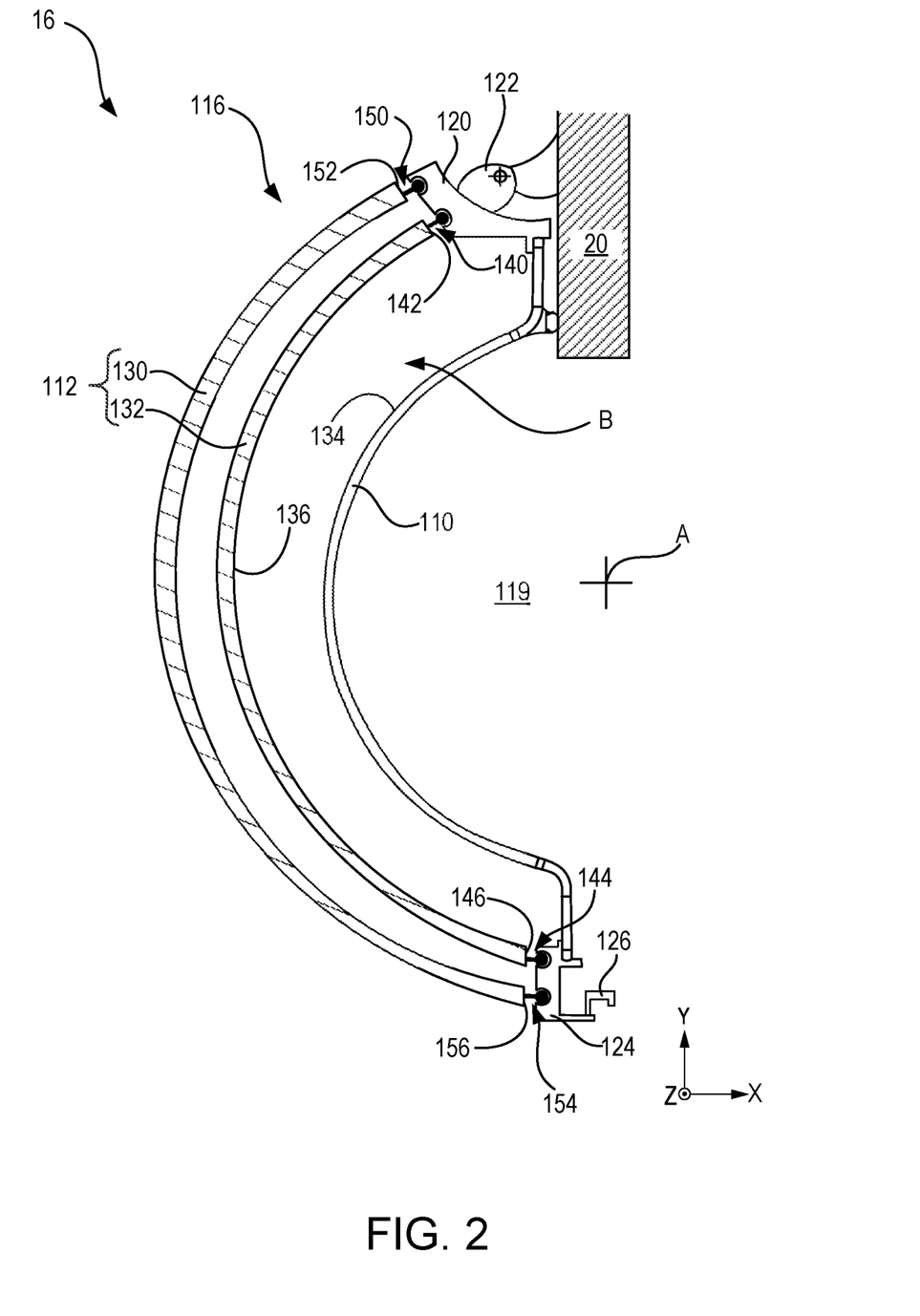
FIG. 2 illustrates a cross-section view, taken along the line 2-2 in FIG. 1A, of a translating sleeve type thrust reverser, in accordance with various embodiments.

With reference to FIG. 2, and continuing reference to FIG. 1B, a cross-section view of the left half 116 of thrust reverser 16 is illustrated. In FIG. 2, gas turbine engine 102 and cascade 114 have been removed to illustrate the features of thrust reverser 16 more clearly. While features and functionalities of the left half 116 of thrust reverser 16 are described and depicted in FIGS. 2, 3, 4A and 4B, it is contemplated and understood that the right half 118 of thrust reverser 16 is a mirror image of the left half 116 and includes the features and functionalities as described herein with reference to the left half 116.

IFS 110 may define, at least, a portion of a core engine compartment 119. IFS 110 and translating sleeve 112 may be attached to pylon 20 via a hinge beam 120. Hinge beam 120 may be hingedly coupled to pylon 20 via a hinge joint 122. In this regard, left half 116 may pivot about hinge joint 122 and relative to pylon 20 in order to provide access to gas turbine engine 102. IFS 110 may encase the core of gas turbine engine 102 (FIG. 1B). In this regard, IFS 110 encases the engine components located between fan 104 and exhaust system 18. Hinge beam 120 is located at a first circumferential end of the left half 116 of thrust reverser 16. Hinge beam 120 may be located between the left half 116 of thrust reverser 16 and pylon 20. Translating sleeve 112 is slidably attached to hinge beam 120.

A latch beam 124 is located at a second circumferential end of the left half 116 of thrust reverser 16. Latch beam 124 may include one or more latch(es) 126 configured to secure the left half 116 of thrust reverser 16 to the right half 118 of thrust reverser 16. The second circumferential end of the left half 116 of thrust reverser 16 is located opposite the first circumferential end of left half 116. For example, the second circumferential end of left half 116 is approximately 180°, about the central longitudinal axis A of nacelle 10, from the first circumferential end of left half 116. As used in the previous context, the term "approximately" means±20°. Translating sleeve 112 is slidably attached to latch beam 124.

In accordance with various embodiments, translating sleeve 112 includes an outer panel 130 and an inner panel 132 (also referred to herein as a first translating sleeve panel and a second translating sleeve panel, respectively). Outer panel 130 and inner panel 132 may be attached to one another at an aft end of translating sleeve 112. Outer panel 130 is located radially outward of inner panel 132. A radially outward surface 134 of IFS 110 and a radially inward surface 136 of inner panel 132 may define, at least, a portion of a bypass flow duct B through which bypass airflow from fan 104 (FIG. 1B) flows. Cascade 114 (FIG. 1B) is located radially between inner panel 132 and outer panel 130 of translating sleeve 112. Outer and inner panels 130, 132 are configured to translate (e.g., slide) forward and aft relative to hinge beam 120 and latch beam 124. Stated differently, outer and inner panels 130, 132 may slide aft to translate from a stowed position to a deployed position. Outer and inner panels 130, 132 slide forward to translate from the deployed position to the stowed position. In the stowed position, inner panel 132 and IFS 110 form the bypass flow duct B boundaries such that no bypass airflow is allowed into cascade 114, and thereby causing the bypass airflow to flow aft to the exhaust system to provide forward thrust. In the deployed position, cascade 114 is exposed and bypass flow duct B is, at least partially, blocked by blocker doors extending radially into bypass flow duct B aft of cascade 114, thereby causing, at least, a portion of the bypass airflow to flow out cascade 114 to provide reverse thrust.

In accordance with various embodiments, translating sleeve 112 includes an upper primary slider 140 located at a first circumferential end 142 of inner panel 132 and a lower primary slider 144 located at a second circumferential end 146 of inner panel 132. Second circumferential end 146 is opposite the first circumferential end 142. For example, second circumferential end 146 may be approximately 180°, about the central longitudinal axis A of nacelle 10, from first circumferential end 142. As used in the previous context, the term "approximately" means ±20°.

Translating sleeve 112 further includes an upper secondary slider 150 located at a first circumferential end 152 of outer panel 130 and a lower secondary slider 154 located at a second circumferential end 156 of outer panel 130. Second circumferential end 156 is opposite the first circumferential end 152. For example, second circumferential end 156 may be approximately 180°, about the central longitudinal axis A of nacelle 10, from first circumferential end 152. As used in the previous context, the term "approximately" means ±20°.

Figure 3:
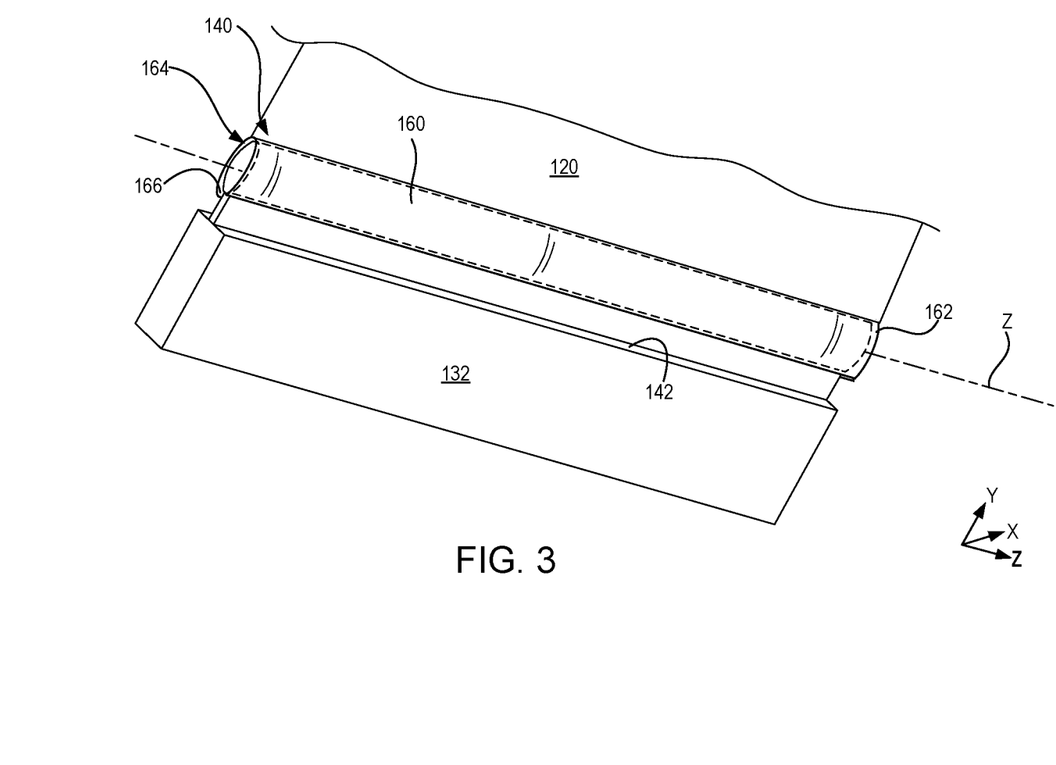
FIG. 3 illustrates a primary slider assembly for a translating sleeve of a thrust reverser, in accordance with various embodiments.

With reference to FIG. 3, additional details of upper primary slider 140 are illustrated. In accordance with various embodiments, upper primary slider 140 may engage hinge beam 120, whereby inner panel 132 is secured to hinge beam 120 and slides relative thereto. In various embodiments, upper primary slider 140 includes an upper primary slider bar 160, and hinge beam 120 includes an upper primary slider track 162. Upper primary slider bar 160 may be attached to inner panel 132 along first circumferential end 142. In various embodiments, upper primary slider bar 160 may be attached to inner panel 132 along an entire, or a near entire, axial length of inner panel 132. In various embodiments, the axial length of upper primary slider bar 160 may be approximately equal to the axial length of upper primary slider track 162. As used in the previous context only, "approximately" means the axial length of upper primary slider bar 160 is within 10% of the axial length of upper primary slider track 162. The length of primary slider bar 160 being approximately equal to the axial length of inner panel 132 and to the axial length of upper primary slider track 162 tends to increase and/or maximize support of inner panel 132, while decreasing and/or minimizing radially outward airflow leakage from bypass duct B (FIG. 2).

Upper primary slider bar 160 may be attached to inner panel 132 via fasteners, welding, adhesive, or any other suitable means of securement. In various embodiments, upper primary slider bar 160 may be integrally formed with inner panel 132 (e.g., upper primary slider bar 160 and inner panel 132 may be formed as a single structure by, for example, molding, subtractive manufacturing, additive manufacturing, or any other suitable manufacturing technique). In various embodiments, upper primary slider bar 160 may have a generally cylindrical shape. In this regard, upper primary slider bar 160 may have a circular cross-section, when taken in a plane perpendicular to the direction of translation of upper primary slider bar 160 (e.g., in a plane perpendicular to the translation axis Z of upper primary slider bar 160). While upper primary slider bar 160 is illustrated as having a cylindrical shape, it is contemplated and understood that upper primary slider bar 160 may be formed in any desired shape. For example, in various embodiments, upper primary slider bar 160 may be a rectangular shape. In this regard, upper primary slider bar 160 may have a square or rectangular cross-section taken in the plane perpendicular to translation axis Z. Translation axis Z represents the axis along which upper primary slider bar 160 translates.

Upper primary slider bar 160 is designed to slide in an upper primary channel 164 defined by upper primary slider track 162. Upper primary slider track 162 may be attached to hinge beam 120 via fasteners, welding, adhesive, or any other suitable means of securement. In various embodiments, upper primary slider track 162 is integrally formed with hinge beam 120. In this regard, hinge beam 120 may define upper primary channel 164. In various embodiments, a liner may be located along upper primary channel 164. For example, a liner may be located between upper primary slider bar 160 and the slide track surface 166 defining upper primary channel 164. With momentary combined reference to FIG. 3 and FIG. 2, in accordance with various embodiments, lower primary slider 144 engages latch beam 124 in manner similar to upper primary slider 140 engaging hinge beam 120. In various embodiments, lower primary slider 144 includes a lower primary slider bar similar to upper primary slider bar 160. Latch beam 124 defines a lower primary channel similar to upper primary channel 164 and/or includes a lower primary slider track similar to upper primary slider track 162.

Figure 4A:
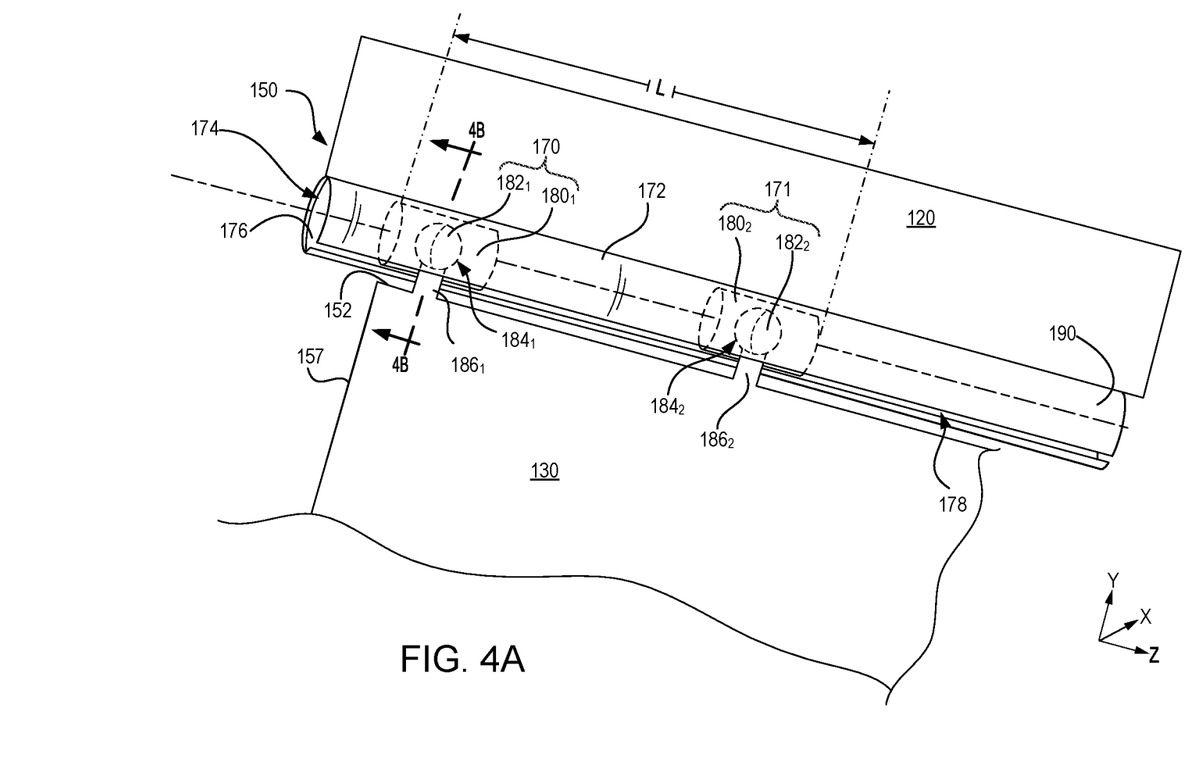
FIG. 4A illustrates a secondary slider assembly for a translating sleeve of a thrust reverser, in accordance with various embodiments.

With reference to FIG. 4A, additional details of upper secondary slider 150 are illustrated. In accordance with various embodiments, upper secondary slider 150 may engage hinge beam 120, whereby outer panel 130 is secured to hinge beam 120 and slides relative thereto. In various embodiments, upper secondary slider 150 includes a first articulating slider 170 and a second articulating slider 171. First articulating slider 170 may be located proximate a forward edge 157 of outer panel 130. First articulating slider 170 may be located closer to forward edge 157, as compared to second articulating slider 171. Each of first articulating slider 170 and second articulating slider 171 includes a slider bar 180 and a slider ball 182. Stated differently, first articulating slider 170 includes a first slider bar $180_1$ and a first slider ball $182_1$, and second articulating slider 171 includes a second slider bar $180_2$ and a second slider ball $182_2$. In accordance with various embodiments, the axial length L of upper secondary slider 150 is less than the axial length of upper primary slider bar 160 (FIG. 3) and less than the axial length of outer panel 130. Axial length L is measured between the forward edge of first slider bar $180_1$ and the aft edge of second slider bar $180_2$. In various embodiments, axial length L may be 50% or less of the axial length of outer panel 130. In various embodiments, axial length L may be 25% or less of the axial length of outer panel 130. In this regard, first articulating slider 170 and second articulating slider 171 may support forward end of outer panel 130.

Figure 4B:
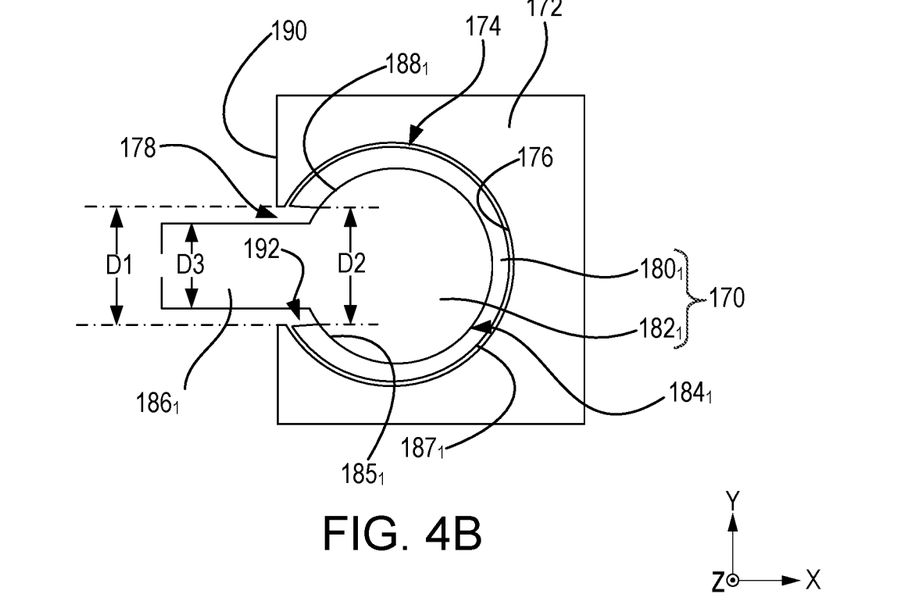
FIG. 4B illustrates a cross-section view, taken along the line 4B-4B of the secondary slider assembly in FIG. 4A, in accordance with various embodiments.

With combined reference to FIGS. 4A and 4B, each of first slider ball $182_1$ and second slider ball $182_2$ is spherical in shape. First slider bar $180_1$ defines a first spherical opening $184_1$ configured to receive first slider ball $182_1$. Second slider bar $180_2$ defines a second spherical opening $184_2$ configured to receive second slider ball $182_2$. Stated differently, first slider ball $182_1$ is located in a first spherical opening $184_1$ formed in first slider bar $180_1$, and second slider ball $182_2$ is located in a second spherical opening $184_2$ formed in second slider bar $180_2$. A first neck $186_1$ extends between first slider ball $182_1$ and first circumferential end 152 of outer panel 130. First neck $186_1$ connects first slider ball $182_1$ to outer panel 130. A second neck $186_2$ extends between second slider ball $182_2$ and first circumferential end 152 of outer panel 130. Second neck $186_2$ connects second slider ball $182_2$ to outer panel 130.

First neck $186_1$ and first slider ball $182_1$, and second neck $186_2$ and second slider ball $182_2$ may be attached to outer panel 130 via fasteners, welding, adhesive, or any other suitable means of securement. In various embodiments, first neck $186_1$ and first slider ball $182_1$, and second neck $186_2$ and second slider ball $182_2$ may be integrally formed with outer panel 130. For example, first neck $186_1$, first slider ball $182_1$, second neck $186_2$, second slider ball $182_2$, and outer panel 130 may be formed as a single structure by, for example, molding, subtractive manufacturing, additive manufacturing, or any other suitable manufacturing technique.

In accordance with various embodiments, hinge beam 120 includes an upper secondary slider track 172. First articulating slider 170 and second articulating slider 171 are designed to slide in an upper secondary channel 174 defined by upper secondary slider track 172. In this regard, each of first slider bar $180_1$ and second slider bar $180_2$ is located in and slides along upper secondary channel 174. Upper secondary slider track 172 may be attached to hinge beam 120 via fasteners, welding, adhesive, or any other suitable means of securement. In various embodiments, upper secondary slider track 172 is integrally formed with hinge beam 120. In this regard, hinge beam 120 may define upper secondary channel 174. In various embodiments, a liner may be located along upper secondary channel 174. For example, a liner may be located on a slider track surface 176 defining upper secondary channel 174. Each of first and second necks $186_1$, $186_2$ may be located through a track slot 178 formed in upper secondary slider track 172. Track slot 178 extends from an external track surface 190 to slider track surface 176 (e.g., track slot 178 extends to upper secondary channel 174).

Referring now to FIG. 4B, first spherical opening $184_1$ is defined by a first internal surface $185_1$ of first slider bar $180_1$. First internal surface $185_1$ of first slider bar $180_1$ is opposite a first external surface $187_1$ of first slider bar $180_1$. First external surface $187_1$ is oriented toward and/or contacts slider track surface 176 (or contacts a liner located on slider track surface 176). First internal surface $185_1$ is oriented toward and/or contacts an exterior surface $188_1$ of first slider ball $182_1$. First neck $186_1$ is located through a bar slot 192 formed in first slider bar $180_1$. Bar slot 192 extends from first external surface $187_1$ to first internal surface $185_1$ (e.g., bar slot 192 extends to first spherical opening $184_1$). A diameter D1 of track slot 178, a diameter D2 of bar slot 192, and a diameter D3 of first neck $186_1$ are each selected to allow first slider ball $182_1$ to articulate (e.g., rotate) within first spherical opening $184_1$. Stated differently, a clearance (i.e., spacing) between track slot 178 and first neck $186_1$, and a clearance (i.e., spacing) between bar slot 192 and first neck $186_1$ are selected to reduce, or eliminate, chances of first neck $186_1$ contacting upper secondary slider track 172 and/or first slider bar $180_1$. In this regard, loads experienced by outer panel 130 can be transferred to first slider bar $180_1$ via contact between exterior surface $188_1$ of first slider ball $182_1$ and first internal surface $185_1$ of first slider bar $180_1$, and then from first slider bar $180_1$ to upper secondary slider track 172 via contact between first external surface $187_1$ of first slider bar $180_1$ and slider track surface 176. While FIG. 4B illustrates first articulating slider 170, it is contemplated and understood that second articulating slider 171 includes features and functionalities, as described herein with reference to first articulating slider 170 in FIG. 4B.

Returning to FIG. 4A, allowing first and second slider balls $182_1$, $182_2$ to articulate (e.g., rotate) within first and second spherical openings $184_1$, $184_2$, respectively, allows outer panel 130 to articulate relative to first and second slider bars $180_1$, $180_2$. The articulation of outer panel 130 and first and second slider balls $182_1$, $182_2$ tends to reduce, or eliminate, end loading and/or contact stresses between upper secondary slider track 172 and first and second slider bars $180_1$, $180_2$, thereby decreasing wear and/or occurrences of damage to the first and second slider bars $180_1$, $180_2$ and/or to the upper secondary slider track 172 or track liner.

Figure 4C:
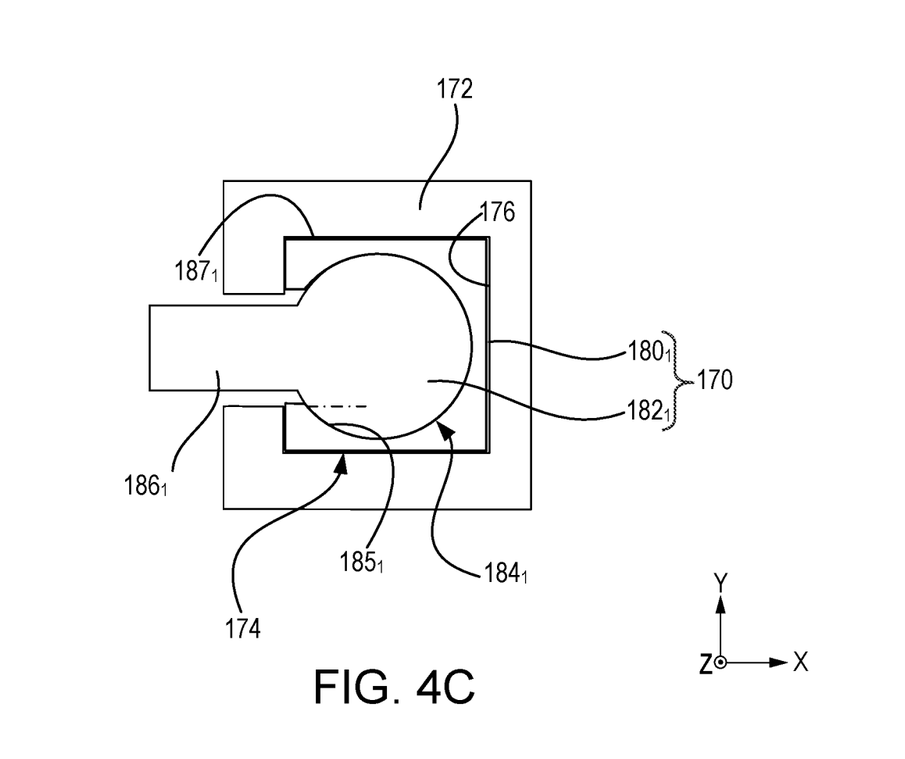
FIG. 4C illustrates a cross-section view of a secondary slider assembly having a rectangular slider bar, in accordance with various embodiments.

In various embodiments, each of first slider bar $180_1$ and second slider bar $180_2$ has a cylindrical shape with a spherical opening formed in the cylinder. While each of first slider bar $180_1$ and second slider bar $180_2$ is illustrated as having a cylindrical shape, it is contemplated and understood that first slider bar $180_1$ and/or second slider bar $180_2$ may be formed in any desired shape. For example, and with momentary reference to FIG. 4C, in various embodiments, first slider bar $180_1$ may have a rectangular shape with first spherical opening $184_1$ formed therein. First internal surface $185_1$ of first slider bar $180_1$ defines first spherical opening $184_1$ and first external surface $187_1$ has a rectangular or square shape. The shape of upper secondary channel 174 complements the shape of first external surface $187_1$. In this regard, slider track surface 176 may define a rectangular shaped upper secondary channel 174 (e.g., the upper secondary channel 174 may have a square or rectangular cross-section, when taken in a plane perpendicular to the direction of translation of first slider bar $180_1$).

With combined reference to FIG. 4A and FIG. 2, in accordance with various embodiments, lower secondary slider 154 engages latch beam 124 in manner similar to the manner in which upper secondary slider 150 engages hinge beam 120. In various embodiments, lower secondary slider 154 includes a first lower articulating slider and a second lower articulating slider similar to above-described first articulating slider 170 and second articulating slider 171, respectively. Lower secondary slider 154 is located at the forward corner of outer panel 130. Latch beam 124 defines a lower secondary channel similar to upper secondary channel 174 and/or includes a lower secondary slider track similar to upper secondary slider track 172.

Figure 5A:
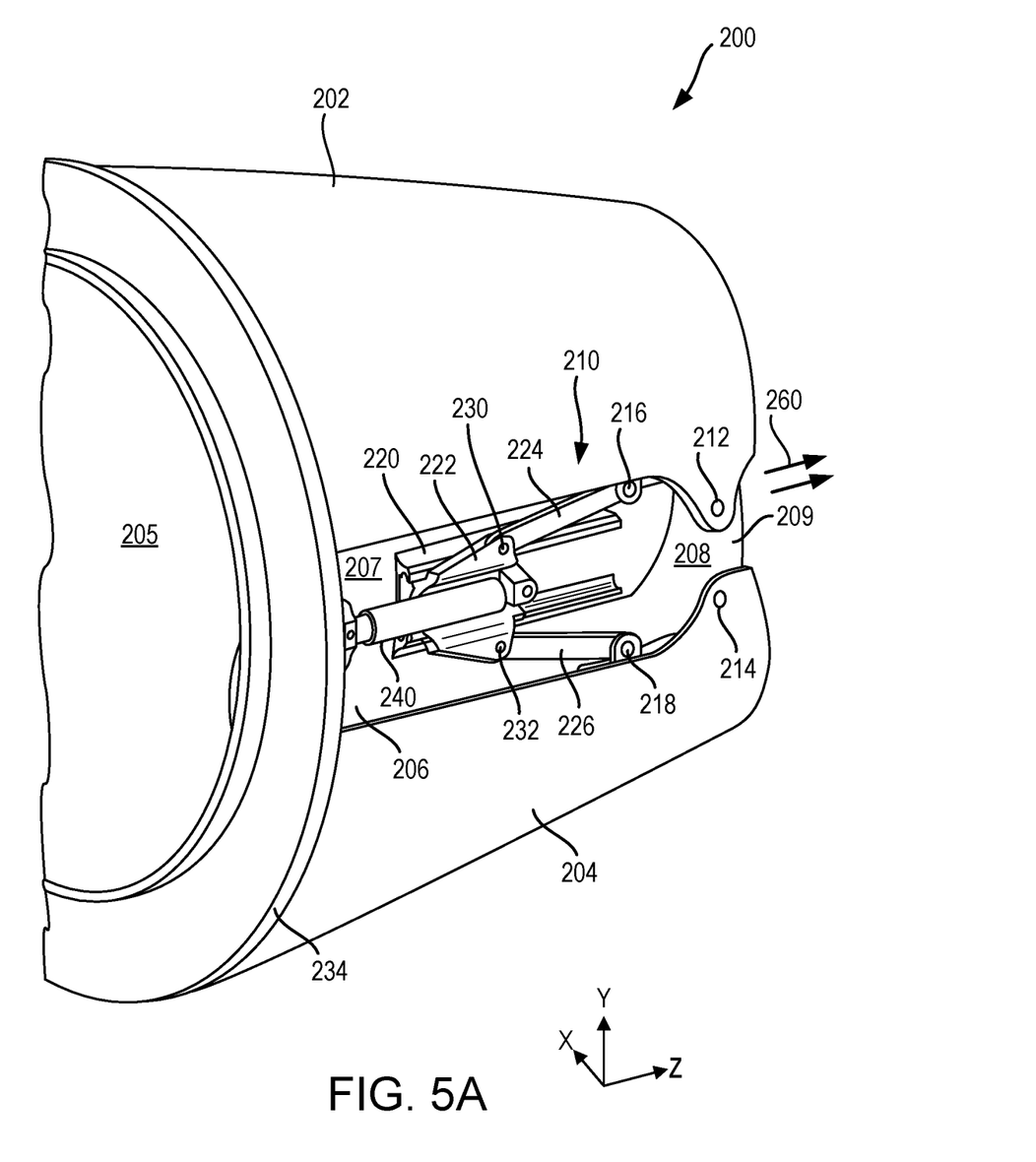
FIGS. 5A and 5B illustrate perspective views of a translating door type thrust reverser in a stowed position and a deployed position, respectively, in accordance with various embodiments.
Figure 5B:
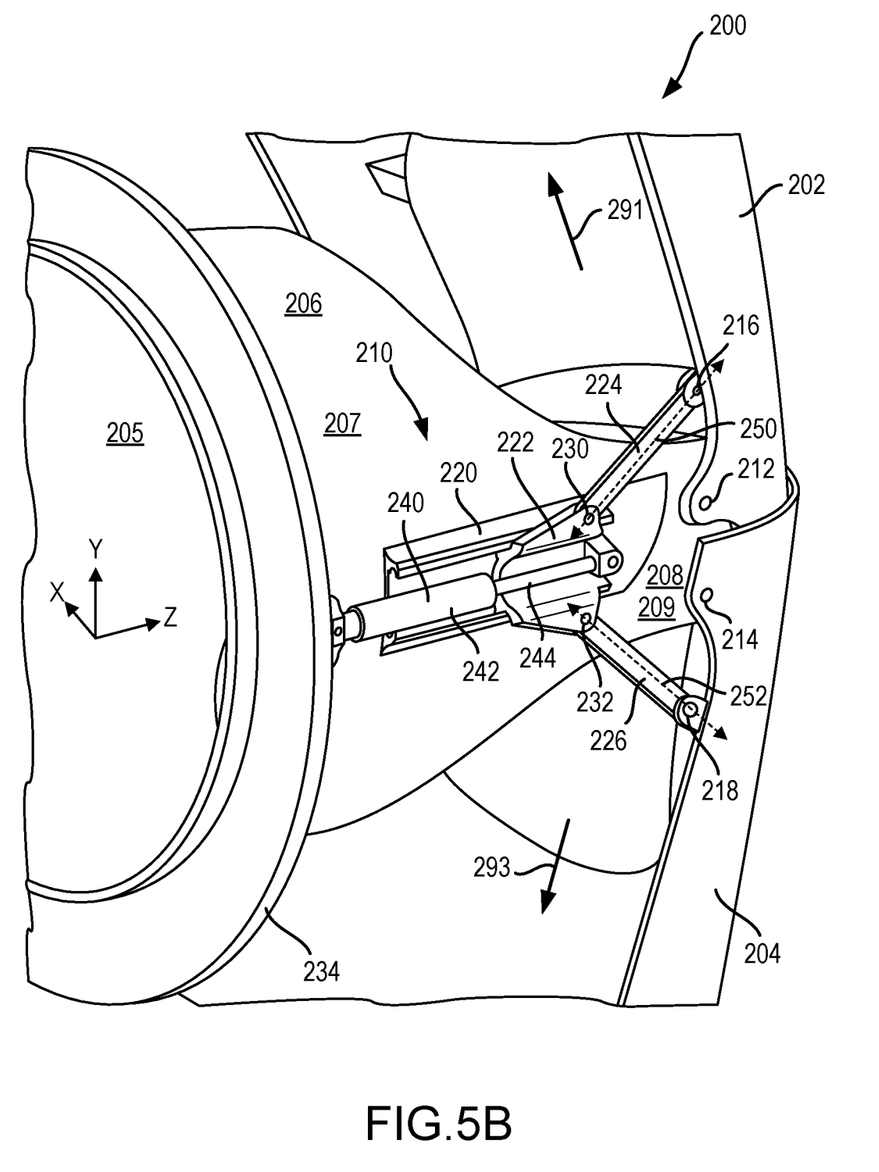

With reference to FIGS. 5A and 5B, a perspective view of a thrust reverser 200 in a stowed position and a deployed position are illustrated, respectively. In various embodiments, nacelle 10 (FIG. 1A) may include thrust reverser 200 in place of thrust reverser 16. In accordance with various embodiments, thrust reverser 200 includes an upper reverser door 202, a lower reverser door 204, and a frame 206. In various embodiments, frame 206 includes an annular structure 207 with a pair of opposing side beams 208 extending from annular structure 207. The pair of opposing side beams 208 may include a left side (or first) beam 209 and a right side (or second) beam, similar to left side (or first) beam 209. The pair of opposing side beams 208 may provide a structural support for mounting related components and operating the thrust reverser 200 between deployed and stowed positions. Upper reverser door 202 is moveable relative to frame 206. Lower reverser door 204 is moveable relative to frame 206.

In various embodiments, upper reverser door 202 is rotatably coupled to frame 206 via a hinge 212 (also referred to herein as a first hinge). In various embodiments, lower reverser door 204 is rotatably coupled to frame 206 via a hinge 214 (also referred to herein as a second hinge). It is contemplated herein that hinge 212 and hinge 214 may comprise two distinct hinges, or may comprise a common hinge, depending on the thrust reverser design.

In various embodiments, an actuation arrangement 210 is mounted to the port side beam 209. It is noted that a fairing, which is normally located over actuation arrangement 210 and provides an aerodynamic surface extending between, and generally flush with upper reverser door 202 and lower reverser door 204, is removed in FIGS. 5A and 5B in order to clearly show actuation arrangement 210. In various embodiments, a second actuation arrangement is mounted to the starboard side beam. The second actuation arrangement may be similar to actuation arrangement 210 and the two actuation arrangements may be generally symmetric about central axis A (FIG. 1A). Stated differently, the starboard side actuation arrangement and side beam configuration may be symmetrical with the port side actuation arrangement and side beam configuration described herein. In this regard, although described herein with respect to the port side, it should be understood that the starboard side may comprise a similar arrangement as the port side.

In various embodiments, actuation arrangement 210 may include one or more components mounted to port side beam 209. Actuation arrangement 210 is configured to facilitate rotation of the upper reverser door 202 and the lower reverser door 204 between the open (i.e., deployed) position and the closed (i.e., stowed) position. Actuation arrangement 210 comprises a track 220 and a carrier 222 slidably coupled to the track 220. The carrier 222 may be configured to translate (e.g., slide) along the track 220. Carrier 222 may be moveable between a first position (FIG. 5A) corresponding to a closed position of the thrust reverser doors, and a second position (FIG. 5B) corresponding to the open position of the thrust reverser doors. Actuation arrangement 210 may further comprise a first link 224 and a second link 226. First link 224 may be pivotally coupled to carrier 222 at a first end thereof via a hinge 230 and pivotally coupled to upper reverser door 202 at a second end thereof via a hinge 216. Second link 226 may be pivotally coupled to carrier 222 at a first end thereof via a hinge 232 and pivotally coupled to lower reverser door 204 at a second end thereof via a hinge 218.

In response to carrier 222 translating in a first direction (e.g., in an aft direction (the positive Z-direction)) along track 220, a load 250 (FIG. 5B) is transmitted between carrier 222 and upper reverser door 202, via first link 224, which urges upper reverser door 202 to rotate about hinge 212 towards the open position. Similarly, in response to carrier 222 translating in the first direction along track 220, a load 252 (FIG. 5B) is transmitted between carrier 222 and lower reverser door 204, via second link 226, which urges lower reverser door 204 to rotate about hinge 214 towards the open position.

In response to carrier 222 translating in a second direction (e.g., in a forward direction (the negative Z-direction)) along track 220, load 250 is transmitted between carrier 222 and upper reverser door 202, via first link 224, which urges upper reverser door 202 to rotate about hinge 212 towards the closed position. Similarly, in response to carrier 222 translating in the second direction along track 220, load 252 is transmitted between carrier 222 and lower reverser door 204, via second link 226, which urges lower reverser door 204 to rotate about hinge 214 towards the closed position. In this regard, first link 224 and second link 226 may be configured to transmit tensile and compressive loads between upper reverser door 202 and carrier 222 and lower reverser door 204 and carrier 222, respectively.

In response to the thrust reverser 200 assuming the closed or stowed position, the upper reverser door 202 and the lower reverser door 204, the outer surfaces of the upper reverser door 202 and the lower reverser door 204 blend with the outer surface of the nacelle, forming a smooth aerodynamic shape of the nacelle. In the same stowed configuration, the bypass airflow 260 exits exhaust duct 205 and is generally unaffected by the thrust reverser 200 or its componentry, as the inner surfaces of the upper reverser door 202 and the lower reverser door 204 are blended with the interior surface of the exhaust duct 205 to provide a generally smooth and annular exhaust flow path from downstream of the core engine exhaust to a downstream exit plane or aft end of the thrust reverser 200. While in the stowed position, the bypass airflow flows out the exhaust duct 205, providing forward thrust necessary to propel the aircraft. In response to the thrust reverser 200 assuming the open or deployed position (e.g., upon landing), the upper reverser door 202 and the lower reverser door 204 are rotated to their open positions (FIG. 5B). The bypass airflow is diverted from the exit of the exhaust duct 205 to form a first stream 291 (FIG. 5B), following an inner surface of the upper reverser door 202 and a second stream 293 (FIG. 5B), following an inner surface of the lower reverser door 204. Both the first stream 291 and the second stream 293 have forward vector components of thrust, which provide the reverse thrust acting on the aircraft.

Central axis A (FIG. 1A) is illustrated extending through the nacelle 10. The upper reverser door 202 may be considered positioned above the central axis A while the lower reverser door 204 may be considered positioned below the central axis A. Similarly, the port side beam 209 may be considered positioned to the port or left side of the central axis A (looking in the fore direction (negative Z-direction)) while the starboard side beam may be considered positioned to the right or starboard side of the central axis A (looking in the fore direction). More generally, reference to a first reverser door may broadly refer to a reverser door positioned opposite a second reverser door with respect to the central axis A, there being no preferred up or down or side to side orientation, while reference to a first side beam may broadly refer to a side beam positioned opposite a second side beam with respect to the central axis A.

In various embodiments, hinge 216, hinge 218, hinge 230, and hinge 232 are floating hinges. As used herein, the term "floating hinge" may refer to an axis of rotation of a hinge, wherein the position of the axis of rotation with respect to frame 206 varies dependent upon the position of carrier 222 with respect to track 220, and consequently the rotational position of upper reverser door 202 and/or lower reverser door 204. In various embodiments, hinge 212 and hinge 214 are fixed hinges. As used herein, the term "fixed hinge" may refer to an axis of rotation of a hinge, wherein the position of the axis of rotation is fixed with respect to frame 206 regardless of (or independent of) the position of carrier 222 with respect to track 220, and consequently the rotational position of upper reverser door 202 and/or lower reverser door 204. Although it is contemplated herein that hinge 212 and hinge 214 may be floating hinges depending on the design of thrust reverser 200.

In various embodiments, carrier 222 may be driven along track 220 via a linear actuator 240. In this regard, linear actuator 240 may be coupled to carrier 222. Linear actuator 240 may comprise any suitable actuator for imparting linear motion to carrier 222, including a mechanical actuator, an electromechanical actuator, a pneumatic actuator, a hydraulic actuator, among others. Linear actuator 240 may be mounted to frame 206. In various embodiments, linear actuator 240 is coupled to frame 206. In various embodiments, linear actuator 240 is coupled to bulkhead 234. Linear actuator 240 may comprise a moveable member 244 which may extend from an actuator housing 242 to drive, or move, carrier 222 in the first direction along track 220. Conversely, moveable member 244 may retract or compress into actuator housing 242 to move carrier 222 in the second direction. However, it is contemplated herein that linear actuator 240 may extend or retract to move carrier 222 in the first direction or the second direction along track 220 depending on the location of linear actuator 240 with respect to carrier 222. In this regard, upper reverser door 202 and lower reverser door 204 may move between stowed and deployed positions in response to linear actuator 240 extending and/or retracting.

Figure 6A:
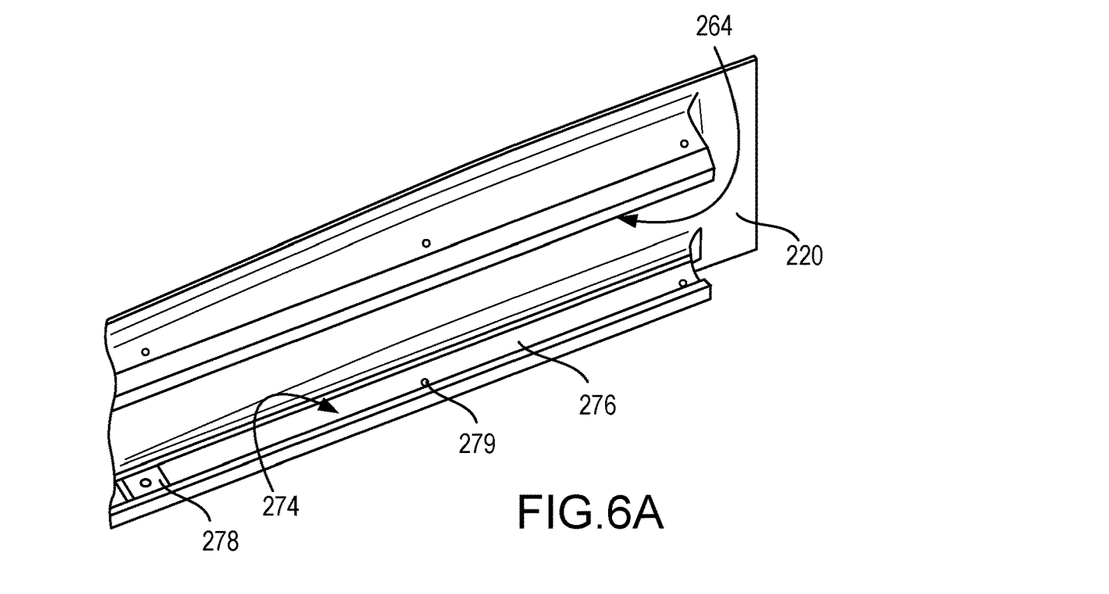
FIGS. 6A and 6B illustrate perspective views of a track and a carrier, respectively, for facilitating actuation of the thrust reverser of FIGS. 5A and 5B, in accordance with various embodiments.
Figure 6B:
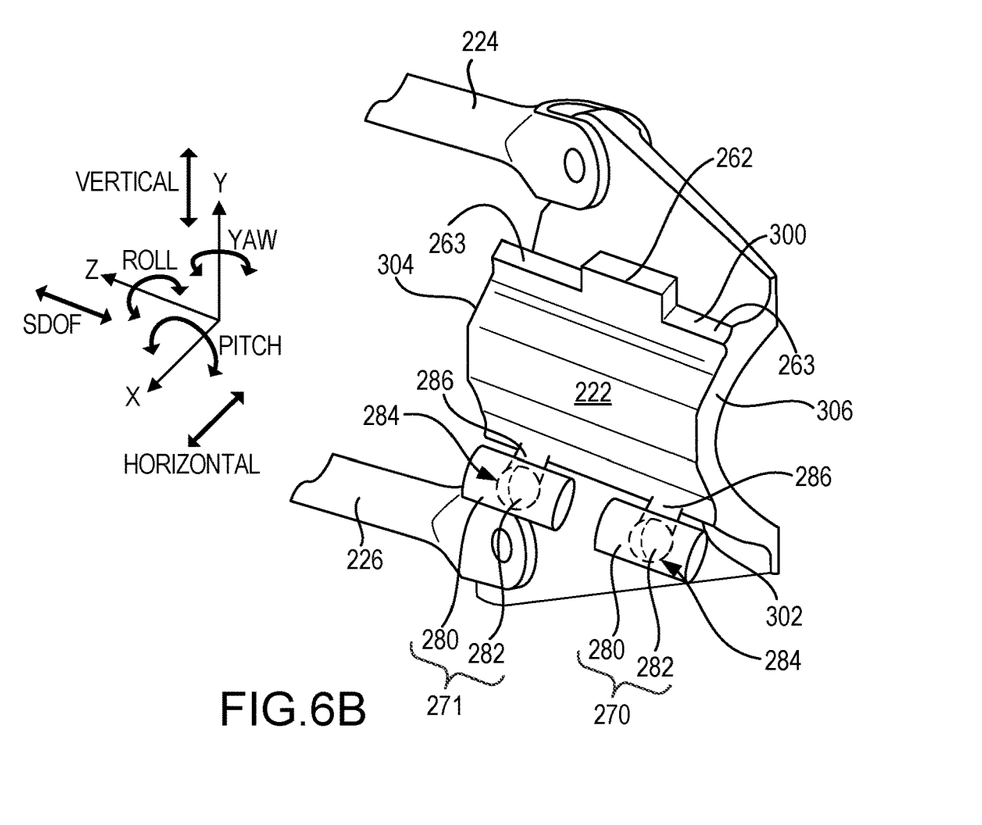

With reference to FIGS. 6A and 6B, addition details of track 220 and carrier 222 are illustrated. Carrier 222 may comprise an upper (or first) slider 262, a first articulating slider 270, and a second articulating slider 271. Track 220 may comprise a first channel 264 and a second channel 274. Upper slider 262 may be received by first channel 264. First articulating slider 270 and second articulating slider 271 may be received by second channel 274. In this manner, the carrier 222 may be retained by the track 220. In various embodiments, track 220 is coupled to frame 206 (FIGS. 5A and 5B). In various embodiments, track 220 and frame 206 are integrally formed as a monolithic structure (i.e., frame 206 may define first channel 264 and second channel 274).

Upper slider 262 is located at a first end 300 of carrier 222. First articulating slider 270 and second articulating slider 271 are located at a second end 302 of carrier 222. First end is opposite second end 302. In various embodiments, upper slider 262 is attached to carrier 222 along an entire, or nearly an entire, length of upper slider 262. Slider 262 may be recessed with respect a forward end 304 and an aft end 306 of carrier 222. For example, a radial surface 263 extends axially between forward end 304 of carrier 222 and upper slider 262, and between aft end 306 of carrier 222 and upper slider 262.

First articulating slider 270 may be located proximate forward end 304 of carrier 222. Second articulating slider 271 may be located proximate aft end 306 of carrier 222. Stated differently, first articulating slider 270 may be located closer to forward end 304, as compared to second articulating slider 271, and second articulating slider 271 may be located closer to aft end 306, as compared to first articulating slider 270. Each of first articulating slider 270 and second articulating slider 271 includes a slider bar 280 and a slider ball 282, similar to the above-described first articulating slider 170 and second articulating slider 171, respectively. Each of the slider balls 282 is spherically shaped and is located in a spherical opening 284 defined by the respective slider bar 280. Each of slider balls 282 is connected to carrier 222 via a neck 286. Necks 286 and slider balls 282 may be attached to carrier 222 via fasteners, welding, adhesive, or any other suitable means of securement. In various embodiments, necks 286 and slider balls 282 may be integrally formed with carrier 222. For example, necks 286, slider balls 282, and carrier 222 may be formed as a single monolithic structure using, for example, molding, subtractive manufacturing, additive manufacturing, or any other suitable manufacturing technique.

Slider bars 280 may be received by second channel 274. Slider balls 282 may articulate (e.g., rotate) within the spherical openings 184. Allowing slider balls 282 to articulate tends to reduce, or eliminate, end loading and/or contact stresses between track 220 and slider bars 280, which deceases wear and/or damage to the slider bars 280 and/or to the track 220. In this manner, carrier 222 interacts with the track 220 and reacts loads corresponding to five degrees of freedom (vertical, horizontal, roll, pitch, and yaw) of carrier 222 with respect to track 220, thereby transferring loads associated with these degrees of freedom from carrier 222, into track 220, and into frame 206. As used herein, "vertical" may refer to movement of carrier 222 parallel the Y-axis (i.e., vertically) with respect to track 220. As used herein, "horizontal" may refer to movement of carrier 222 parallel the X-axis (i.e., horizontally) with respect to track 220. As used herein, "roll" may refer to rotation of carrier 222 about the Z-axis with respect to track 220. As used herein, "pitch" may refer to rotation of carrier 222 about the X-axis with respect to track 220. As used herein, "yaw" may refer to rotation of carrier 222 about the Y-axis with respect to track 220. Linear actuator 240 reacts loads between frame 206 and carrier 222 only along a single direction (single degree of freedom). Namely, linear actuator 240 transfers loads between frame 206 and carrier 222 along a line-of-action of linear actuator 240. As used herein, the term "line-of-action" may refer to a direction, or axis, through a point at which a force is applied in the same direction as the vector of the force. In this regard, a line-of-action of an actuator may refer to a longitudinal axis of the actuator for a single degree of freedom actuator mechanism that transfers a force along the direction of its longitudinal axis. For example, said line-of-action of linear actuator 240 (FIGS. 5A and 5B) may be along the Z-axis. It is contemplated herein that the linear actuator 240 may further incorporate spherical type bearings at each end to accommodate manufacturing tolerances, structural deflections, etc.

While slider bars 280 are illustrated as having a cylindrical shape, it is contemplated and understood that slider bars 280 may be formed in any desired shape. For example, in various embodiments, slider bars 280 may be a rectangular shape.

In various embodiments, a first liner is disposed between first channel 264 and upper slider 262. In various embodiments, a second liner 276 is disposed between second channel 274 and first and second articulating sliders 270, 271. The first liner and/or the second liner 276 may comprise a metal material or a polymer material. The first liner and/or second liner 276 may reduce a coefficient of friction between first channel 272 and upper slider 262, and/or between second channel 274 and first and second articulating sliders 270, 271 (e.g. between second channel 274 and the exterior surface of slider bars 280). Furthermore, the first liner and/or second liner 276 may be configured as wear surfaces which may be replaced during maintenance. In various embodiments, the first liner and/or second liner 276 may be configured as wear surfaces comprising a hardness which is greater than track 220, thereby increasing the wear life of track 220. Second liner 276 may conform to the geometry of second channel 274 and may extend along second channel 274 to provide a continuous surface upon which first and second articulating sliders 270, 271 may ride. Second liner 276 may be retained to track 220 via an end block 278 and/or fasteners 279. With momentary reference to FIGS. 3 and 4A, it is contemplated and understood that the liners, which may be located in upper primary channel 164, upper secondary channel 174, the lower primary channel, and/or the lower secondary channel may be similar to the first liner and the second liner 276, as described above with reference to track 220.

Figure 7A:
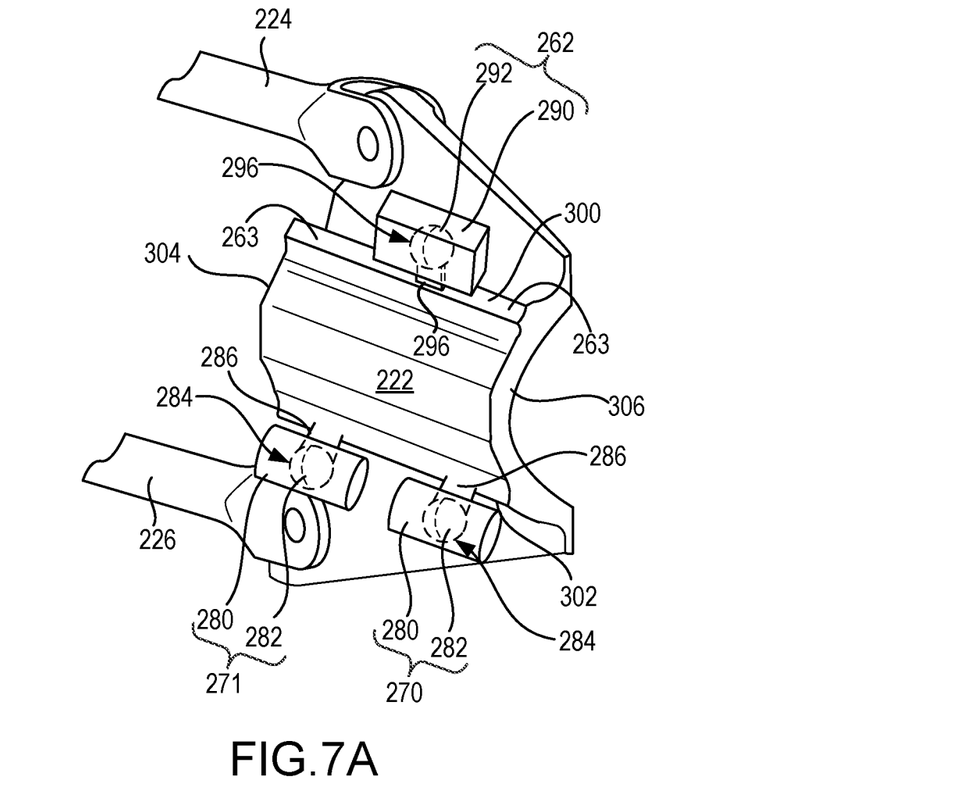
FIGS. 7A and 7B illustrate a perspective view of a carrier and a cross-section view of an articulating slider in a track, respectively, of the thrust reverser of FIGS. 5A and 5B, in accordance with various embodiments.
Figure 7B:
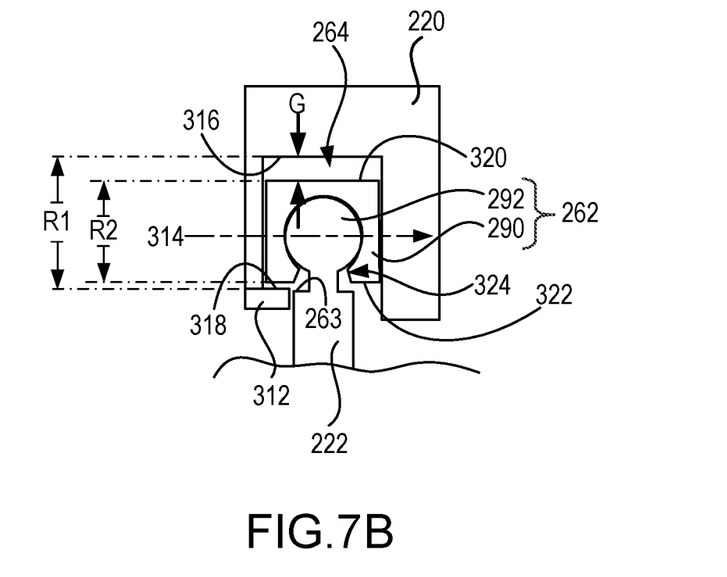

With reference to FIGS. 7A and 7B, in various embodiments, upper slide 262 may be an articulating slider. In this regard, upper slide 262 includes a slider bar 290 and a slider ball 292. Slider ball 292 is spherically shaped and is located in a spherical opening 294 defined by slider bar 290. Slider ball 292 is connected to carrier 222 via a neck 296. Neck 296 and slider ball 292 may be attached to carrier 222 via fasteners, welding, adhesive, or any other suitable means of securement. In various embodiments, neck 296 and slider ball 292 may be integrally formed with carrier 222.

In various embodiments, slider bar 290 may have a rectangular shape. The shape of first channel 264 in track 220 complements the shape of slider bar 290. In accordance with various embodiments, a radial length R1 of first channel 264 and a radial length R2 of slider bar 280 are configured to create a gap G between slider bar 280 and track 220 (e.g., radial length R2 is less than radial length R1). Gap G allows slider bar 290 to translate vertically, within first channel 264. In this regard, gap G accommodates relative tolerance and deflection in the vertical direction (i.e., in directions parallel to the Y-axis) between first and second articulating sliders 270, 271 and articulating upper slider 262 and in associated features of track 220. Gap G tends to allow for easier installation by allowing for slight variations/tolerances between parts and during assembly. Accommodating deflections also tends to reduce occurrence of slider jamming.

In various embodiments, track 220 includes a stopper 312. Stopper 312 may be formed integrally with track 220 or may be coupled to track 220. Stopper 312 is located on the end of track 220 that is proximate to and/or oriented toward radial surface 263 of carrier 222. Stopper 312 is configured to guide and/or restrict the pitch of slider bar 290. Line 314 in FIG. 7B represents the pitch axis of articulating upper slider 262. In accordance with various embodiments, radial length R1 is measured between stopper 312 and an upper (or first) surface 316 of track 220 and an upper (or first) stopper surface 318 of stopper 312. Upper surface 316 of track 222 defines, at least, a portion of first channel 264 and is oriented toward surface an upper (or first) bar surface 320 of slider bar 290 and toward radial surface 263 of carrier 220. Radial length R2 is measured between upper bar surface 320 of slider bar 290 and a lower (or second) bar surface 322 of slider bar 290. Lower bar surface 322 is opposite, and oriented away from, upper bar surface 320. Lower bar surface 322 defines a bar slot 324 through which neck 296 is located. Lower bar surface 322 is oriented toward upper stopper surface 318 of stopper 312.

While slider bar 290 is illustrated as having a rectangular shape, it is contemplated and understood that slider bar 290 may be formed in any desired shape. For example, in various embodiments, slider bar 290 may be cylindrical and the radial length R2 may be the diameter of the cylinder.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser, comprising:
a first translating sleeve panel;
a first articulating slider located at a circumferential end of the first translating sleeve panel, the first articulating slider including a first slider bar and a first slider ball, wherein the first slider ball is attached to the first translating sleeve panel and is located in a first spherical opening defined by the first slider bar;
a second articulating slider located at the circumferential end of the first translating sleeve panel, the second articulating slider including a second slider bar and a second slider ball, wherein the second slider ball is attached to the first translating sleeve panel and is located in a second spherical opening defined by the second slider bar;
a hinge beam located proximate the circumferential end of the first translating sleeve panel;
a second translating sleeve panel located radially inward of the first translating sleeve panel; and
a primary slider coupled to the second translating sleeve panel, wherein an axial length of the primary slider is greater than the axial length measured between a forward end of the first slider bar and an aft end of the second slider bar.

2. The thrust reverser of claim 1, wherein the first articulating slider further includes a first neck extending between the first slider ball and the circumferential end of the first translating sleeve panel, and wherein the second articulating slider further includes a second neck extending between the second slider ball and the circumferential end of the first translating sleeve panel.

3. The thrust reverser of claim 2, wherein the first neck is located through a first bar slot defined by the first slider bar and the second neck is located through a second bar slot defined by the second slider bar.

4. The thrust reverser of claim 3, wherein the first translating sleeve panel translates relative to the hinge beam.

5. The thrust reverser of claim 4, further comprising a secondary track coupled to the hinge beam, wherein the first slider bar and the second slider bar are located in a secondary track channel defined by the secondary track.

6. The thrust reverser of claim 4, wherein the first slider bar and the second slider bar are located in a secondary track channel defined by the hinge beam.

7. The thrust reverser of claim 4, wherein the second translating sleeve panel is configured to translate relative to the hinge beam.

8. The thrust reverser of claim 7, further comprising a primary slider track coupled to the hinge beam, wherein the primary slider is located in a primary track channel defined by the primary slider track.

9. The thrust reverser of claim 7, wherein the primary slider is located in a primary track channel defined by the hinge beam.

10. A nacelle, comprising:
an inlet;
a fan cowl; and
a thrust reverser including:
a first translating sleeve panel;
a first articulating slider located at a circumferential end of the first translating sleeve panel, the first articulating slider including a first slider bar and a first slider ball, wherein the first slider ball is attached to the first translating sleeve panel and is located in a first spherical opening defined by the first slider bar;

a second articulating slider located at the circumferential end of the first translating sleeve panel, the second articulating slider including a second slider bar and a second slider ball, wherein the second slider ball is attached to the first translating sleeve panel and located in a second spherical opening defined by the second slider bar;

a hinge beam located proximate the circumferential end of the first translating sleeve panel;

a second translating sleeve panel located radially inward of the first translating sleeve panel; and a primary slider coupled to the second translating sleeve panel, wherein an axial length of the primary slider is greater than the axial length measured between a forward end of the first slider bar and an aft end of the second slider bar.

11. The nacelle of claim 10, wherein the first articulating slider further includes a first neck extending between the first slider ball and the circumferential end of the first translating sleeve panel, and the first neck being located through a first bar slot defined by the first slider bar, and wherein the second articulating slider further includes a second neck extending between the second slider ball and the circumferential end of the first translating sleeve panel, and the second neck being located through a second bar slot defined by the second slider bar.

12. The nacelle of claim 10, wherein the first translating sleeve panel translates relative to the hinge beam, wherein the first slider bar and the second slider bar are located in a secondary track channel defined by at least one of the hinge beam or a secondary track coupled to the hinge beam.

13. The nacelle of claim 12, wherein the second translating sleeve panel is configured to translate relative to the hinge beam.

14. The nacelle of claim 13, wherein the primary slider is located in a primary track channel defined by the hinge beam or a primary slider track coupled to the hinge beam.

* * * * *